April 28, 1970 H. P. JENSEN 3,509,554

ROTATABLE HEAD POSITIONER WITH V-BLOCK BEARINGS

Filed April 16, 1968 3 Sheets-Sheet 1

ROTATABLE HEAD POSITIONER WITH V-BLOCK BEARINGS

Filed April 16, 1968 3 Sheets-Sheet 2

HAROLD P. JENSEN
Inventor
by Thomas N. Tarrant
Attorney

April 28, 1970 H. P. JENSEN 3,509,554

ROTATABLE HEAD POSITIONER WITH V-BLOCK BEARINGS

Filed April 16, 1968 3 Sheets-Sheet 3

HAROLD P. JENSEN
Inventor
by Thomas N. Tarrant
Attorney 3,509,554

ROTATABLE HEAD POSITIONER WITH V-BLOCK BEARINGS

Harold P. Jensen, Chelmsford, Mass., assignor to Honeywell Inc., Minneapolis, Minn., a corporation of Delaware Filed Apr. 16, 1968, Ser. No. 721,846
Int. Cl. G11b *5/42, 5/54, 21/14*
U.S. Cl. 340—174.1 10 Claims

ABSTRACT OF THE DISCLOSURE

A mounting assembly for a magnetic tape recording head is described which permits the head to be rotated out of position for threading tape or cleaning. A cylindrical shaft is mounted in self-aligning V-block bearings and the remaining assembly surfaces critical to head alignment are then machined relative to the shaft. A toggling arrangement spring loads the shaft rotation in either of two fixed positions.

BACKGROUND OF THE INVENTION

High quality magnetic recording requires accurate precise positioning of the recording head. This requirement becomes more critical in digital recording using multitrack heads in which seven tracks and nine tracks are common.

Most practical recording arrangements make it difficult or impossible to thread the recording tape or clean the recording head without moving either the head or the devices that position the tape next to the head during record and playback. One system, that has had limited use, permits the record head to be rotated angularly out of position for tape threading and for cleaning. This system has been complicated in production by the various jigging required to assure accurate alignment. It is also quite sensitive to bearing wear and has required high quality precision bearing surfaces.

SUMMARY OF THE INVENTION

The present invention provides a rotatable support for magnetic recording heads that is low in cost of parts and is essentially self-jigging in manufacture. The rotatable assembly is constructed around a cylindrical steel shaft resting upon V-blocks. The V-blocks are cylindrical pins with a portion of the cylindrical surface flatted for bearing the shaft. These pins rest in cylindrical grooves in a support housing so that forcing the shaft against the flatted surfaces causes the pins to rotate into alignment with the shaft. The shaft is then used as a jigging reference for machining the critical mounting surfaces. The invention further includes a spring-loaded toggling arrangement on the shaft for biasing it in either of two positions. Two rings encircling the shaft are used, one fixed to the shaft as a collar and the second supported swinging on a pin from the fixed one. The second ring clears the shaft by a substantial margin and is spring loaded away from the shaft at a point diametrically opposite to the supporting pin. The spring loading is effective to pull the collar and shaft around against mechanical stops when the supporting pin is off-centered.

Thus, it is an object of the invention to provide a novel rotatable positioner for magnetic recording heads.

It is a further object of the invention to provide a rotatable magnetic recording head positioner in which rotation is centered in a cylindrical shaft supported by V-blocks.

It is a further object of the invention to define a method of assembling a magnetic recording head positioner that is inherently self-aligning and self-jigging.

It is still a further object of the invention to provide novel means for spring loading a shaft in either of two rotational positions.

Further objects and features of the invention will become apparent upon reading the following description along with the drawings.

DESCRIPTION OF THE PREFERRED EMBODIMENT

The present invention provides a high precision magnetic recording head positioner using low cost parts and facilitated assembly procedures. Housing 10 is the main support body depicted in FIGURE 1 for retaining the bearings and for mounting in the recording apparatus. Housing 10 is suitably a die cast aluminum structure having flange 11 projecting from its sides for mounting purposes.

Figure 2:
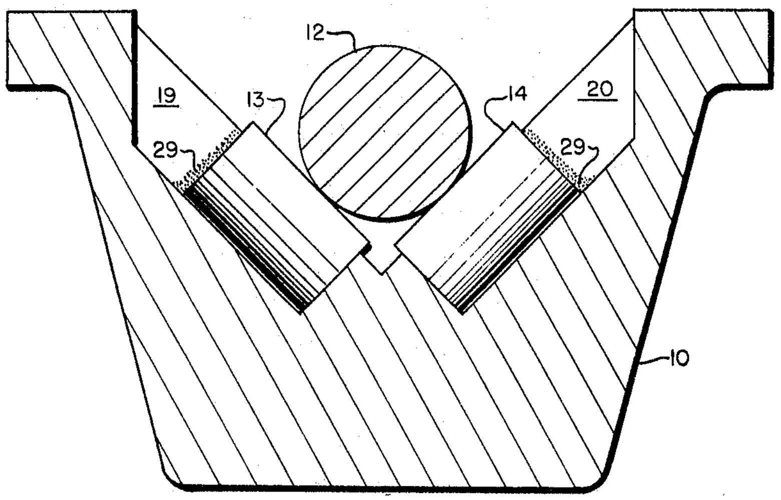
FIGURE 2 is a cross-sectional view taken along line 2—2 of FIGURE 1 rotated ninety degrees counter clockwise.

Cylindrical shaft 12 of a wear resistant material such as stainless steel is supported within housing 10 upon V-block bearings 13, 14, 15 and 16. Bearings 13, 14, 15 and 16 are short cylindrical sections each with a flat portion interrupting the cylindrical surface. Stainless steel dowel pins having a surface portion machined off flat and cut into short lengths have been found suitable. Cylindrical grooves 19, 20, 31 and 33 cast into housing 10 retain bearings 13, 14, 15 and 16 respectively. The grooves are shaped to mate with a cylindrical portion of the respective bearings while holding the flat surfaces clear of the housing structure for receiving shaft 12 as illustrated in FIGURE 2.

Head support member 25 is secured to the end of shaft 12 external to housing 10 for providing a mounting surface for a magnetic recording head. Member 25 is suitably an aluminum die casting and can be secured to shaft 12 by press fitting and/or by use of set screws.

Adjustment screw 26, threaded through member 25, controls axial positioning of member 25 relative to housing 10. Collar 27 secured to shaft 12 by set screws 28 is inside housing 10. Collar 27 can be fixed to shaft 12 by any method that will prevent relative movement between shaft and collar. Axial adjustment spring 30 is a helical spring connected to collar 27 by an aperture (not shown) in the head on pin 31. Other conventional axial tensioning arrangements can be used. Pin 31 is press-fit through a channel in collar 27. Spring 30 is secured at its opposite end by passing through an aperture 34 in back cover plate 32. Spring 30 provides tension drawing shaft 12 in the direction of back cover plate 32. This tension is exerted in opposition to axial adjustment screw 26 which determines the axial position.

Axial adjustment screw 26 rides in a slot in thrust washer 36. Washer 36 rests against front cover plate 37 bolted to the front end of housing 10.

One aspect of the present invention is its ease of assembly. Referring to FIGURE 2, the V-blocks 13 and 14 are secured in proper alignment without the need of external equipment. A bonding substance such as an epoxy bonding plastic is applied to grooves 19 and 20 (also 21 and 22). Flatted cylindrical pieces 13 and 14 (also 15 and 16) are placed in the respective grooves. Then cylindrical shaft 12 is pressed down against the flatted surfaces of the V-blocks causing them to rotate into relative alignment. The pressure is maintained until the bonding material hardens.

The position of shaft 12, while properly seated in the V-blocks, is not necessarily in perfect alignment with any part or surface of housing 10. In accordance with the invention, this is nonsignificant since the assembly is aligned for final machining with respect to shaft 12. For example, the assembly can be supported by shaft 12 in a milling machine arbor. A clamp is used to keep shaft 12 seated firmly against V-blocks 13 to 16. The milling machine is then used to machine surfaces 40, 41 and 42 (FIGURE 3) of flange 11 so that they are precisely normal to shaft 12. Flange 11 has also been made with a continuous mounting surface instead of the separate surfaces 40, 41 and 42. The result is that, when flange 11 is bolted to a support panel, shaft 12 will be perpendicular to the plane of the panel. Next, surface 44 of member 25 to which recording head 45 (FIGURE 3) is to be mounted is machined parallel with axis of shaft 12. Member 25 is secured rigidly to shaft 12 so that no relative motion can occur between the two. One way this has been done is by use of a shrink fitting process. Member 25 may be machined while shaft 12 is supported in an arbor with or without housing 10. Since shaft 12 provides the axis of rotation and all the mounting surfaces are machined relative to shaft 12, skew due to head mounting and positioning is virtually eliminated. Shaft 12 used for machining reference may be a substitute shaft for that purpose and is not necessarily the shaft used in the final assembly.

While perpendicular and parallel relationships have been used in the specific embodiment described and illustrated, other angular relationships are sometimes useful in the practice of the invention depending on the recording apparatus in which the positioner is to be used. In all cases, shaft 12 serves as the axis of reference.

Figure 3:
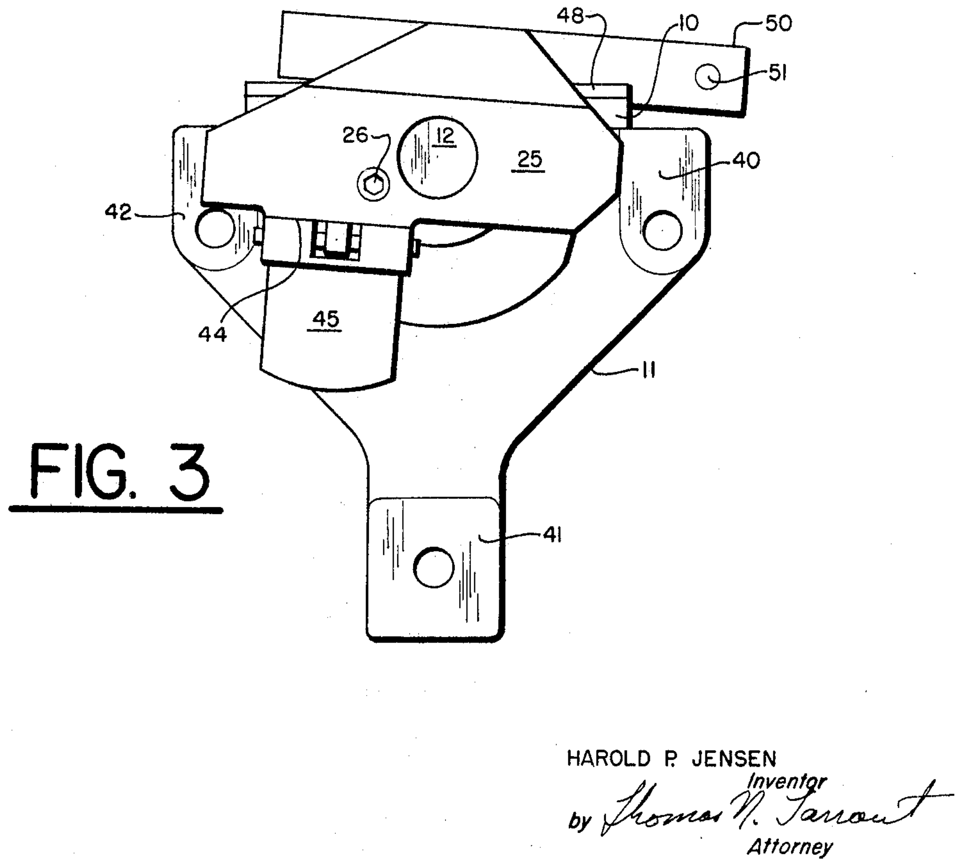
FIGURE 3 is a front elevation of the head positioner of FIGURE 1.

FIGURE 3 is a front elevation of the head positioner showing head mounting member 25 with magnetic recording head 45 secured to mounting surface 44. Flange 11 for mounting the assembly is behind member 25. A portion of top cover plate 48 of housing 10 is shown above and behind member 25. Cover plate 48 is primarily a dust cover and can be thin sheet metal, or other noncritical material.

Depicted at the top of FIGURE 3 is crank 50 secured to the back end of shaft 12. Crank 50 has a crank pin 51 secured at the extreme end of the crank perpendicular to the crank and parallel to the axis of shaft 12.

Figure 1:
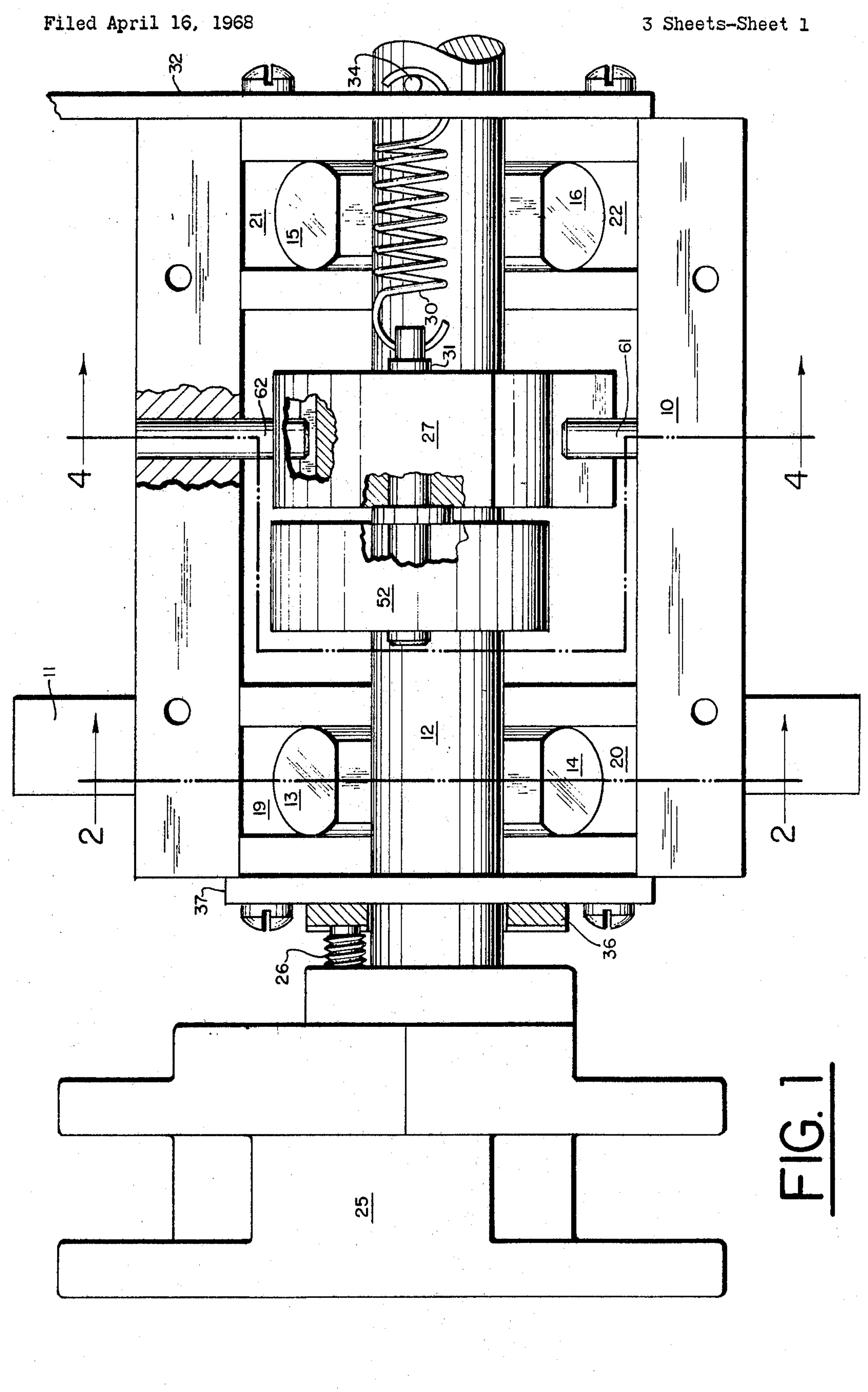
FIGURE 1 is a plan view of the invention head positioner with cover plate removed.

Crank 50 and the end porton of shaft 12 holding crank 50 is not illustrated in FIGURE 1. The crank is used as a means for connecting a driving device to rotate shaft 12 and thus head 45 in and out of operating position. The driving device would be an electrical solenoid, a pneumatic or hydraulic cylinder or a hand manipulated assembly. However, rotation of head 45 in and out of position is readily achieved simply by grasping member 25 and turning it by hand. A cover (not shown) would ordinarily be fastened by screws to member 25. This cover would have a projection or handle to facilitate head rotation by manual means. In the latter case crank 50 is unnecessary.

Figure 4:
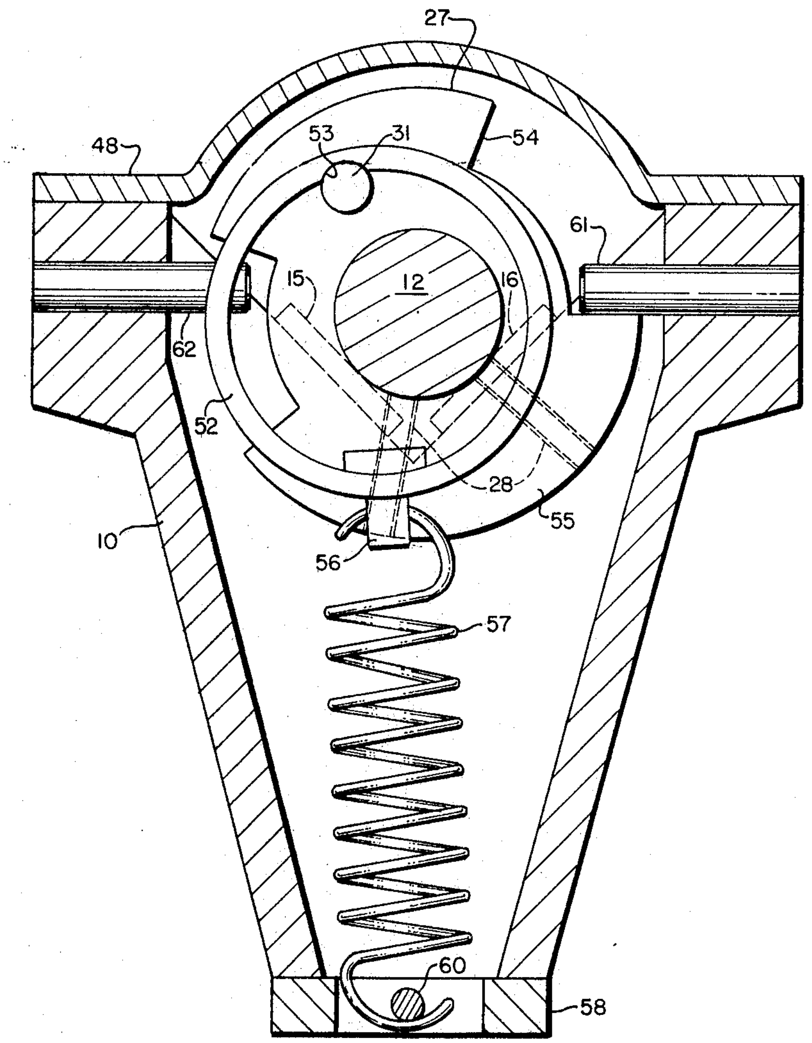
FIGURE 4 is a partial cross-sectional view taken along line 4—4 of FIGURE 1 rotated ninety degrees counter clockwise and depicting the toggling arrangement of the invention.

FIGURE 4 depicts a toggling arrangement for spring biasing the rotation of shaft 12 in either of two stable positions. The toggling arrangement of FIGURE 4 is not necessary when crank 50 is used with a driving device operating between two suitable fixed positions. Some form of loading of shaft 12 to keep it firmly seated in the V-blocks is necessary however, and the toggling spring of FIGURE 4 serves this function in conjunction with the toggle action.

In FIGURE 4, shaft 12 rests in V-blocks 13 to 16 that are in front and behind the cross-sectional plane and are not shown. Collar 27 firmly secured to shaft 12 and has part of its periphery cut away to form top and bottom closed sectors 54 and 55 with open sectors at the sides.

Hardened pins 61 and 62 are press-fit through the walls of housing 10 as to project into the open sectors of collar 27. The lips of closed sector 55 serve in conjunction with hardened pins 61 and 62 as stops limiting the angular rotation of shaft 12. Other means have also been used. The width of closed sector 54 is made small enough so that it does not interfere with rotation.

Ring 52 having an inside diameter substantially greater than the outside diameter of shaft 12 is supported on pin 31 projecting forward from collar 27. Ring 52 contains groove 53 which rides on pin 31 so as to maintain the pivotal position of ring 52 on pin 31 stable. Two rings, one on each side of collar 27 may be used. This would more evenly distribute the loading on the V-blocks and permit heavier spring loading on item 12.

Insert 56, secured to ring 52 approximately opposite groove 53, contains an aperture (not shown) for holding one end of toggle spring 57. Housing 10 has a deep V bottom portion at this location to provide room for spring 57. The bottom of the V is capped by a bottom cover plate 58. Plate 58 contains a pin 60 or other means for securing a second end of spring 57 under tension.

The operation of the toggle action as depicted in FIGURE 4 is that ring 52 is unyieldingly supported by pin 31 to the upper sector 54 at collar 27. Ring 52 is under continuous downward tension from spring 57 pulling against pin 31. The force exerted on pin 31 acts through collar 27 to load shaft 12 against the V-block bearings.

Assuming the unnatural condition that pin 31 could be precisely centered so that the direction of tension was exactly along a centerline through shaft 12, the only force would be downward. However, with pin 31 rotated off-center one way or the other, spring 57 will provide rotational force carrying shaft 12 around until sector 55 of collar 27 comes up against one of stops 61 and 62. In rotation, ring 52 swings one way or the other off-center with respect to the axis of shaft 12. The inner diameter of ring 52 is desirably large enough to permit this off-center swinging without interference from shaft 12.

As depicted in FIGURE 1, rear connection 34 for axial adjustment spring 30 can be used to slightly offest spring 30 with respect to the axis of shaft 12. This provides a small off-center bias to the toggle mechanism. The arrangement in FIGURE 1 provides this bias in favor of the operating position of the recording head. Thus if rotational movement is released from positions covering the greater part of the permissible angles, the head will toggle into operating position. From a relatively small part toward the clockwise end, the head will toggle into the cleaning position.

The V-block bearing arrangement of the present invention is particularly beneficial in use with multiple track digital recording heads since bearing wear introduces no slop and normally does not produce skew. Slight vertical or rotational displacement due to wear is readily compensated. However, tests have indicated that measurable wear is not likely to be encountered during the lifetime of the unit. Life tests providing 20,000 cycles of operation have resulted in no measurable change due to wear of the bearing surfaces. The measuring equipment used would detect wear at least as small as one ten thousandth of an inch.

While the invention has been described with relation to a specific embodiment, many variations thereof are contemplated obvious to those skilled in the art. Thus, it is intended to cover the invention broadly within the spirit and scope of the appended claims.

I claim:

1. A head positioning assembly for transducer positioning in magnetic tape recording apparatus comprising:
- (a) a housing provided;
- (b) a plurality of cylindrical pins, setting in cylindrical grooves in the interior of said housing so as to form a plurality of V-block bearings;
- (c) a cylindrical shaft rotatably supported in said bearings;
- (d) means to load said shaft against said bearings;
- (e) a mounting flange on said housing with a mounting surface precisely oriented relative to said shaft;
- (f) a transducer mounting member secured to one end of said shaft;
- (g) a transducer mounting surface on said mounting member that is precisely oriented relative to said shaft; and
- (h) means to stop the rotation of said shaft in either of two positions whereby when said mounting flange is secured to the mounting board of a magnetic tape recorder and a transducer is mounted on said head positioner, said transducer can be rotated in and out of operating position without loss of positioning accuracy.

2. A head positioning assembly according to claim 1 in which the cylindrical surface of each of said pins is interrupted by a flat portion parallel to the cylindrical axis and the flat portions serve as the bearing surfaces of said V-block bearings.

3. A head positioning assembly according to claim 1 in which the mounting surface of said mounting flange is precisely normal to said shaft.

4. A head positioning assembly acording to claim 3 in which said transducer mounting surface is precisely parallel with the axis of said shaft.

5. A head positioning assembly according to claim 1 wherein said means to load comprises a collar secured to said shaft and at least one spring engaged with said collar and said housing so as to provide a tension forcing said shaft against said bearings.

6. A head positioner according to claim 5 in which said spring is disposed on one side of said shaft and is engaged to said collar on the opposite side of said shaft by connecting means encircling said shaft.

7. A head positioner according to claim 6 in which said connecting means is substantially clear of said shaft and is secured at a single point on said collar whereby said spring tends to rotate said collar and said shaft in one of two directions until a respective one of said two fixed positions is reached.

8. A head positioner according to claim 7 wherein said connecting means is at least one circular ring riding on a pin projecting from said collar.

9. A method of manufacturing a head positioner for magnetic tape recording apparatus comprising:
- (a) providing a housing with interior cylindrical grooves oriented in V-fashion;
- (b) machining flat a portion of the cylindrical surface on a plurality of dowels;
- (c) disposing said dowels in said grooves with the flat surfaces exposed so as to form V-block bearings;
- (d) positioning a cylindrical shaft upon the flat surfaces of said dowel;
- (e) securing tensioning means to load said shaft against said dowels so that said dowels rotate in said grooves until said flat surfaces are each aligned with said shaft;
- (f) securing a head mounting member to said shaft; and
- (g) machining all mounting surfaces using said shaft as a reference whereby said shaft serves as a precise reference for the position of a head mounted on said member.

10. A method of manufacturing a head positioner according to claim 9 in which said dowels are embedded in a bonding substance that hardens while said shaft is loaded against said dowels whereby said dowels are secured in said grooves in true alignment with said shaft.

References Cited

UNITED STATES PATENTS

| | | | |
|---|---|---|---|
| 2,969,584 | 1/1961 | Bobb | 179—100.2 |
| 3,185,484 | 5/1965 | Burdeno | 274—4 |
| 3,190,970 | 6/1965 | Atsumi | 179—100.2 |
| 3,229,044 | 1/1966 | Kokke | 340—174.1 |

BERNARD KONICK, Primary Examiner

V. P. CANNEY, Assistant Examiner

U.S. Cl. X.R.

29—603; 179—100.2; 346—74